United States Patent
Kodden et al.

(10) Patent No.: US 7,591,217 B2
(45) Date of Patent: Sep. 22, 2009

(54) BEVERAGE DEVICE FOR MAKING A BEVERAGE WITH A FOAM LAYER ON TOP

(75) Inventors: Hans Kodden, Hoogeveen (NL); Wilhelmus Johannus Joseph Maas, Someren (NL); Joeke Noordhuis, Hoogeveen (NL)

(73) Assignees: Koninklijke Philips Electronics N.V., Eindhoven (NL); Sara Lee/De N.V., Utrecht (NL)

( * ) Notice: Subject to any disclaimer, the term of this patent is extended or adjusted under 35 U.S.C. 154(b) by 384 days.

(21) Appl. No.: 10/499,626

(22) PCT Filed: Dec. 20, 2002

(86) PCT No.: PCT/IB02/05678

§ 371 (c)(1),
(2), (4) Date: Jun. 21, 2004

(87) PCT Pub. No.: WO03/055366

PCT Pub. Date: Jul. 10, 2003

(65) Prior Publication Data

US 2005/0076783 A1  Apr. 14, 2005

(30) Foreign Application Priority Data

Dec. 24, 2001 (EP) .................................. 01205086

(51) Int. Cl.
*A47J 31/40* (2006.01)
*A47J 31/06* (2006.01)

(52) U.S. Cl. ................. 99/302 R; 99/295; 99/323.1

(58) Field of Classification Search ............... 99/302 R, 99/323.1, 295, 307, 323
See application file for complete search history.

(56) References Cited

U.S. PATENT DOCUMENTS

| 4,789,103 | A | * | 12/1988 | Ruhnke ................. 239/428.5 |
| 4,830,869 | A | | 5/1989 | Wimmers et al. |
| 4,882,982 | A | * | 11/1989 | Muttoni .................. 99/295 |
| 4,921,640 | A | | 5/1990 | Wu |
| 5,150,645 | A | | 9/1992 | Schiettecatte ............... 99/295 |
| 5,295,431 | A | * | 3/1994 | Schiettecatte et al. ........ 99/293 |
| 5,638,740 | A | * | 6/1997 | Cai ......................... 99/295 |
| 5,678,765 | A | | 10/1997 | Dobbs et al. |
| 5,870,943 | A | * | 2/1999 | Levi et al. ................. 99/287 |
| 6,009,792 | A | * | 1/2000 | Kraan ..................... 99/295 |
| 6,158,328 | A | * | 12/2000 | Cai ......................... 99/293 |
| 6,253,667 | B1 | * | 7/2001 | Lussi et al. ................. 99/455 |
| 6,499,389 | B1 | * | 12/2002 | Probst ..................... 99/323.1 |

FOREIGN PATENT DOCUMENTS

| DE | 4037366 A1 | 11/1990 |
| DE | 19705633 A1 | 2/1997 |
| EP | 0878158 | 11/1998 |

(Continued)

*Primary Examiner*—Reginald L Alexander (57) ABSTRACT

A beverage device for making a beverage with a foam layer on top, comprising foaming means for generating foam from said beverage, said foaming means comprising at least one inlet opening (18) for receiving beverage under pressure and at least one outlet opening (38,39) for the beverage with the foam. To obtain a fine and stable foam layer on the beverage, the beverage device is characterized in that the foaming means comprises means for generating a spray (48) of beverage, and said foaming means further comprises a collision surface (34) which, in use, is hit by said spray (48) of beverage, thereby generating foam.

19 Claims, 5 Drawing Sheets

FOREIGN PATENT DOCUMENTS

| | | | |
|---|---|---|---|
| EP | 0878158 A2 | 11/1998 |
| EP | 09040719 A1 | 3/1999 |
| IT | MI2001A000972 * | 3/2001 |
| JP | 9001006 A | 7/1997 |
| WO | 9010411 A1 | 3/1990 |
| WO | 9724051 A1 | 12/1996 |
| WO | 02091889 | 11/2002 |

* cited by examiner

BEVERAGE DEVICE FOR MAKING A BEVERAGE WITH A FOAM LAYER ON TOP

The invention relates to a beverage device for making a beverage with a foam layer on top, comprising foaming means for generating foam from said beverage, said foaming means comprising at least one inlet opening for receiving beverage under pressure and at least one outlet opening for the beverage with the foam.

Such a device is known from European patent application 0 878 158. In this patent application, the device is a coffee apparatus, the foaming means comprises a buffer reservoir spaced from the inlet opening and positioned such that, in use, a jet of coffee extract is squirted from the inlet passage into a surface of coffee extract already received in the buffer reservoir. Coffee extract is fed to the inlet passage under relatively low pressure, and the spout opening of the inlet generates a jet of coffee extract. This jet of coffee extract ends up in the buffer reservoir, so that the buffer reservoir will be filled with a quantity of coffee extract. Due to the fact that the jet of coffee extract is squirted into the liquid surface of the filled buffer reservoir, bubbles will be formed in the buffer reservoir, so that a foam layer is generated. Although the foam generated in this way gives a satisfactory result, the reproducibility of the generated foam is not always sufficient, in particular as regards the size of the foam bubbles. Other coffee makers for brewing coffee with a foam layer on top are the well-known espresso coffee apparatuses. However, espresso coffee makers require a pressure of up to 12-15 bar overpressure, which is much higher than in the coffee maker of the above described type, which requires only about 1.4 bar.

It is an object of the invention to provide a beverage device for making a beverage with a fine and stable foam layer on the beverage.

According to the present invention, this object is achieved in that the foaming means comprises means for generating a spray of beverage, and said foaming means further comprises a collision surface which, in use, is hit by said spray of beverage, thereby generating foam. A spray of beverage consists of a plurality of fine droplets that hit the collision surface. The impact of the droplets causes a generation of fine bubbles or foam, which foam together with the beverage flows towards the outlet opening and can then be received in a cup or drinking glass. The result is a beverage with a fine and stable foam layer on top.

To obtain a reliable and continuous spray, a preferred embodiment of the device comprises a whirl chamber having a central outlet opening for generating a conical spray of beverage.

The rotating conical spray increases the impact of droplets on the collision surface and hence the generation of foam.

Further preferred embodiments and advantages of the invention are set forth in the dependent claims.

Further features, effects, and details of the invention are described with reference to the embodiment of a coffee maker shown in the drawings.

Figure 1:
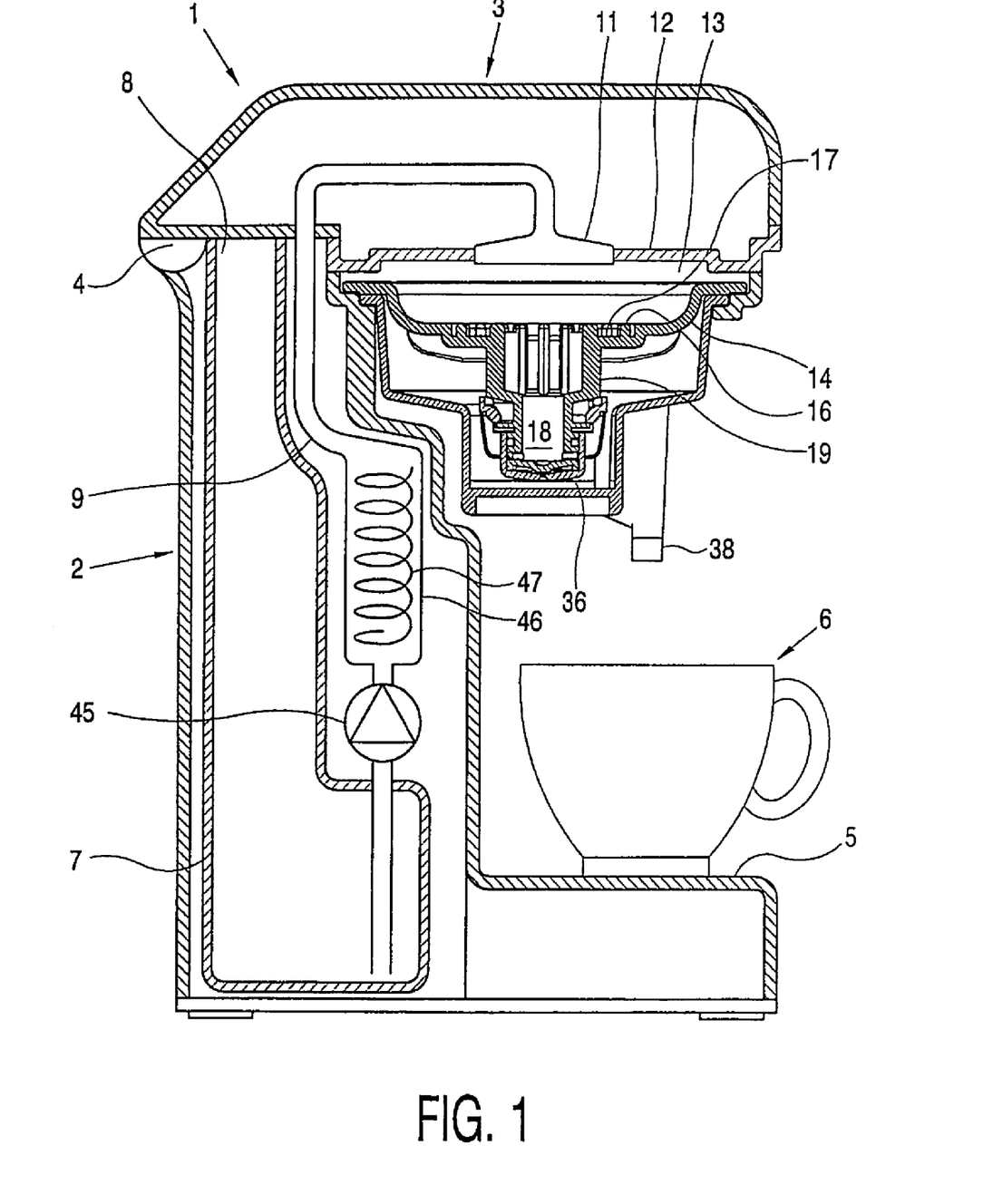
FIG. 1 is a lateral cross-sectional view of a coffee maker comprising an example of an apparatus according to the present invention.

In FIG. 1, reference numeral 1 designates a coffee maker according to the invention for preparing coffee extract having a small-bubble foam layer.

The coffee maker 1 has a housing 2 and a cover 3 hinged to the housing 2 by a hinge 4 and fixed in closed position by latches (not shown). The housing 2 has a forwardly extending portion of which a top surface 5 forms a plateau for supporting one or more cups 6 to be filled with coffee. Within the housing, a water reservoir 7 is located which is open at a top end 8 when the cover 3 is open and closed when the cover 3 is in the closed operating condition shown in FIG. 1. A conduit 9 extends through a heating chamber 46 in which an electric heating element 47 is arranged. A pump 45 is arranged in the conduit 9 upstream of the heater 47 for supplying water from the reservoir 8.

Figure 2:
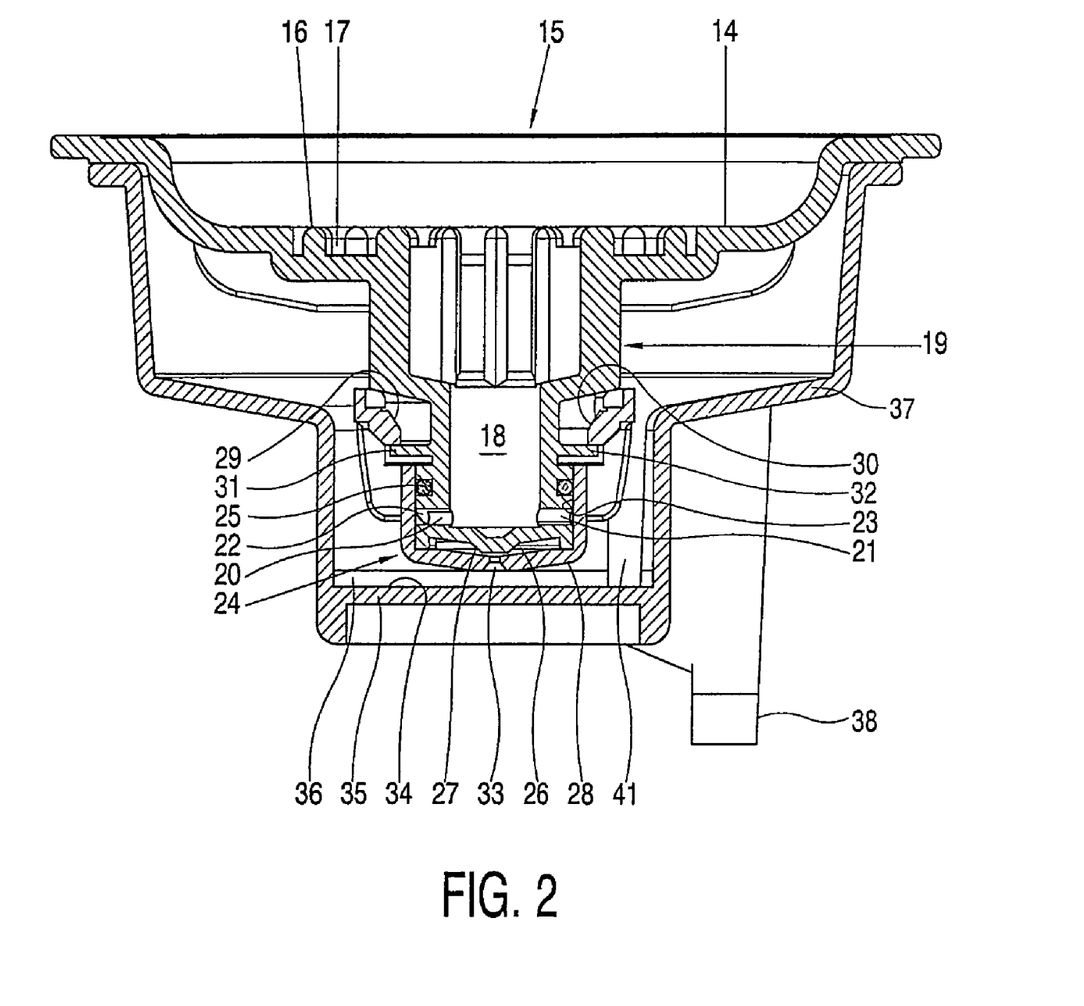
FIG. 2 is an enlarged view of a coffee extracting unit of the coffee maker according to FIG. 1.
Figure 4:
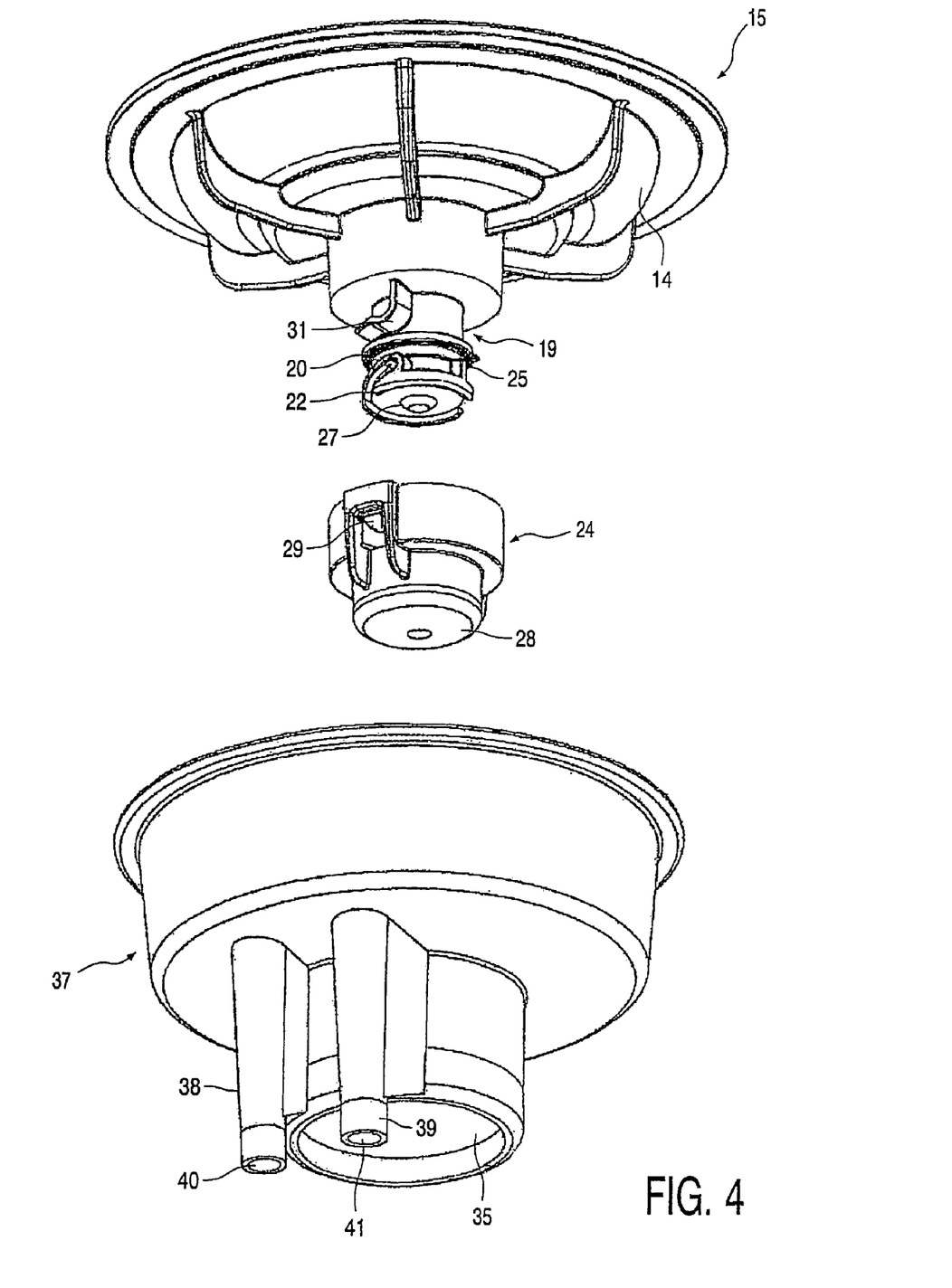
FIG. 4 is an exploded view of the coffee extracting unit according to FIG. 2.

A sprinkling head 11 which is located in a top wall 12 of an extracting chamber 13 forms the end of the conduit 9. The top end of a tray and spout part 15, which is also shown separately in FIGS. 2 and 4, forms a bottom 14 of the extracting chamber 13. The bottom 14 forms a tray with support stubs 16 and interspaces 17 facilitating coffee extract pressed out of a coffee pouch arranged on top of the bottom to flow into an inlet passage 18 downstream of the extracting chamber 13. In operating condition, the extracting chamber is hermetically sealed against water so that no significant loss of pressure generated by the pump 45 occurs and all or virtually all pressure generated by the pump 45 reaches the extracting chamber 13 when coffee is being extracted. It is observed that, even though the extracting chamber according to the present example is adapted for receiving coffee pouches, a suitably fine mesh in the bottom or use of coffee filters would in principle allow the use of loose ground coffee.

The inlet passage 18 extends through a stub 19 that projects from the bottom 14. Near a bottom end, the inlet passage branches into two twister branches of which upstream portions 20, 21 (see also FIG. 3) branch radially away from the main branch of the inlet channel and of which downstream portions 22 extend in screw-like fashion about the outside of the stub 19 and are also bound by the inner surface 23 of a cup 24 which receives a bottom end of the stub 19 and is sealed against the stub by an O-ring 25 when in operating condition.

Figure 3:
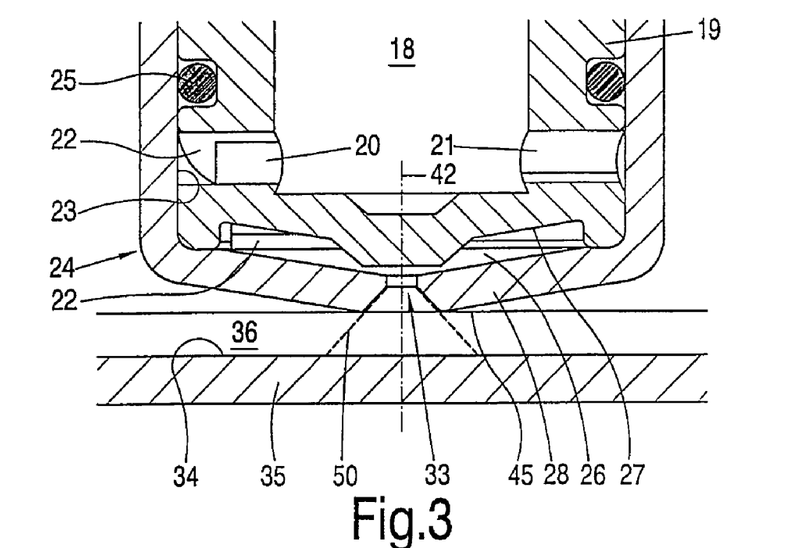
FIG. 3 is an enlarged cross-sectional view of a bottom portion of the coffee extracting unit shown in FIG. 2.

The inlet channel's 18 downstream branch portions 22 issue into a whirl chamber 26 between an end 27 of the stub 19 and the bottom 28 of the cup 24. The cup 24 is detachably connected to the stub 19 by a bayonet closure composed of notches 29, 30 engaging ribs 31, 32. That the cup 24 is detachably connected to the stub 19 provides the advantage that the whirl chamber 26 can be easily cleaned. The bayonet closure is quickly connectable and disconnectable but nevertheless forms a reliable connection also when an operation axial pressure is applied to the cup 24 due to the pressure at which coffee extract is supplied to the whirl chamber 26.

An outlet passage 33 extends from a central portion of the bottom 28 of the whirl chamber 26, and its outlet end faces a top surface 34 of a bottom 35 of a lower housing 37 in which the bottom 14 of the extracting chamber 13, the stub 19, and the cup 24 are suspended. The outlet passage 33 is located at a small distance from the top surface 34, which surface acts as a collision surface 34 for coffee extract as will be explained hereinafter.

The space 36 between the bottom 28 of the cup 24 and the bottom 35 of the lower housing 37 communicates with two dispensing passages 40, 41 extending through dispensing spouts 38, 39 via which coffee extract can flow to the cups 6 on the platform 5.

For forming foam on coffee extract, the apparatus is provided with a coffee extract path extending from the extracting chamber 13, which coffee extract path is in this example formed by the inlet passage 18 for receiving coffee extract, the whirl chamber 26 downstream of the inlet passage 18 for receiving coffee extract from the inlet passage 18, and the outlet passage 33 extending from the whirl chamber 26 for discharging coffee extract from the whirl chamber 26. The configuration of the branches 20, 21 and 22 of the inlet passage causes the coffee extract in the whirl chamber 26 to rotate during operating, and coffee extract is discharged in a rotating condition from the whirl chamber 26 via the outlet passage 33. The rotating coffee extract (see FIG. 5) causes a conical spray 48 when discharged through the outlet passage 33. The spray consists of a plurality of fine droplets which hit the collision surface 34. The impact of the droplets causes a generation of very fine bubbles or foam. The coffee extract with the foam flows via space 36, dispensing channels 40,41, and spouts 38,39 into the cup(s) 6. The foam floating on the coffee extract thus provides the required "crema" effect on the coffee. A particular advantage of making coffee with the "crema" effect in this way is that the required pressure can generally be lower than in a known apparatus in which the coffee extract is squirted into a buffer quantity of coffee extract in a buffer reservoir. Satisfactory results have been obtained, for example, at pressures of about 1 bar overpressure, whereas in the known apparatus generally about 1.4 bar is required to obtain a satisfactory "crema".

Figure 5:
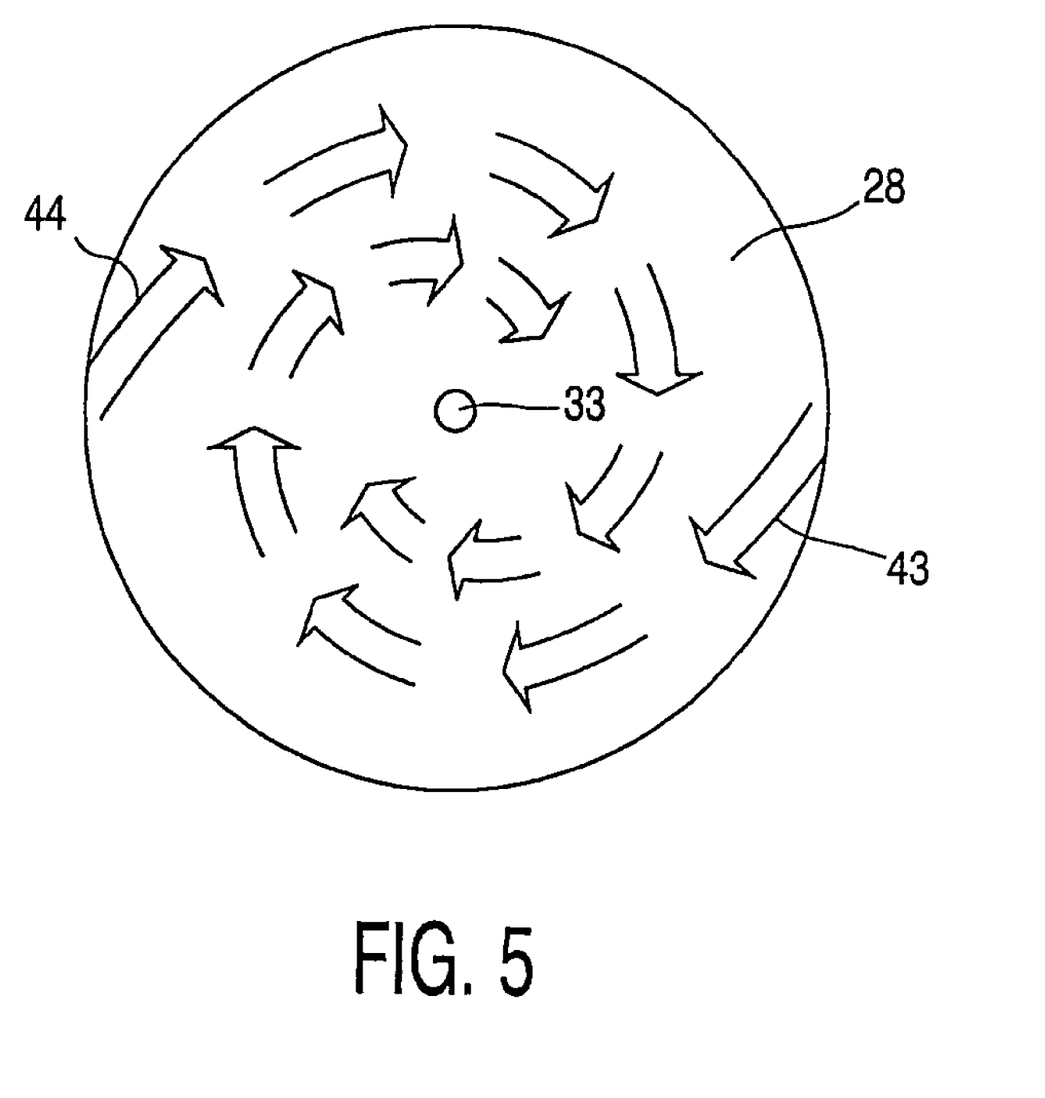
FIG. 5 is a schematized representation in top plan view of the coffee extract flow through a whirl chamber of the apparatus according to the invention.

It is particularly advantageous for obtaining an effective foam formation, that the apparatus is arranged for imparting the rotation about an axis 42 (FIG. 3) and that the outlet passage 33 has an upstream end coaxial with the axis 42. As is illustrated by FIG. 5, the rotating coffee extract forms a vortex and is discharged from a core of the vortex. The internal bottom surface of the whirl chamber 26 slopes inwardly downward to a central portion from where the outlet passage 33 extends. It was been found that this feature is also advantageous for generating a conical spray 48 and thus for an effective foam formation, in particular if the bottom surface has a conical shape.

More in general, it is advantageous if the outlet passage 33 extends from a lowermost portion of the inner bottom surface of the whirl chamber 26, because this ensures that all the coffee extract is drained at the end of the preparation of each serving.

In the present example, the rotation is imparted to the coffee extract in the whirl chamber 26 in that the downstream portions 22 of the branches of the inlet channel 18 issue into the whirl chamber 26 in directions having a directional component tangential to the central axis 42 of the whirl chamber 26. In FIG. 5, arrows 43, 44 schematically indicate these directions. This is advantageous, because no separate moveable parts are required and the impulse imparted to the coffee extract in the chamber is proportional to the amount of coffee extract that is being supplied to the chamber. However, the rotation may be imparted in numerous alternative manners, for example using externally driven stirring blades, air, steam, and/or guide ribs in the inlet passage, which may, for example, extend helically with a pitch which reduces in downstream direction.

Since more than one of the inlet passages 22 issue into the whirl chamber 26, and the tangential directional components of the directions in which the inlet passages 22 issue into the chamber are oriented in accordance with a common sense of rotation about the central axis 42, the feeding of coffee extract is distributed over several positions, and the rotation is also imparted in several positions. This is advantageous for evenly distributing coffee extract and motion circumferentially, especially if the positions where the inlet passages 22 issue into the whirl chamber 26 are evenly distributed circumferentially about the axis 42.

It was also been found that it is advantageous for obtaining an effective foam formation if a wall portion 27 of the whirl chamber 26 facing an upstream end of the outlet passage 33 is located at less than 0.5 to 1.0 mm from the upstream end of the outlet passage.

Furthermore, for effective operation, the outlet passage 33 preferably is a nozzle having a most restricted section 44 with a smallest cross-sectional surface and widening in downstream direction from the most restricted section 44, preferably at an average angle of 45° to 70° degrees to a central axis 42 of the outlet passage 33. The most restricted section 44 of the outlet passage 33 preferably has a cross-sectional surface area of less than 1 mm$^2$. This applies in particular to apparatuses intended to prepare one or two cups of coffee at a time at a pressure in the reservoir 7 or at the outlet passage 33 of 0.8 to 1.2 bar. Good foaming results have been obtained when the downstream end 45 of the outlet passage 33 faces the collision surface 34 transverse to the outlet passage 33 at a distance of 3 to 7 mm.

In the present example, the proposed apparatus is integrated into a coffee maker for preparing coffee extract and, for this purpose, comprising the extracting chamber 13 for retaining ground coffee during extraction of coffee extract, which extracting chamber communicates with the inlet passage 18 and is located upstream thereof. However, it is alternatively possible to provide such apparatus as a separate device for foaming up coffee extract which has been prepared in an otherwise conventional apparatus or which is supplied as instant coffee or concentrated coffee extract. For this purpose, the inlet passage may be connected, for example, to a pressure pump or a reservoir for pressurizing the coffee extract after it has left the extracting chamber. It will be clear that within the framework of the present invention many obvious and non-obvious modifications from the above described example other than the above-described variants are also conceivable.

Figure 3A:
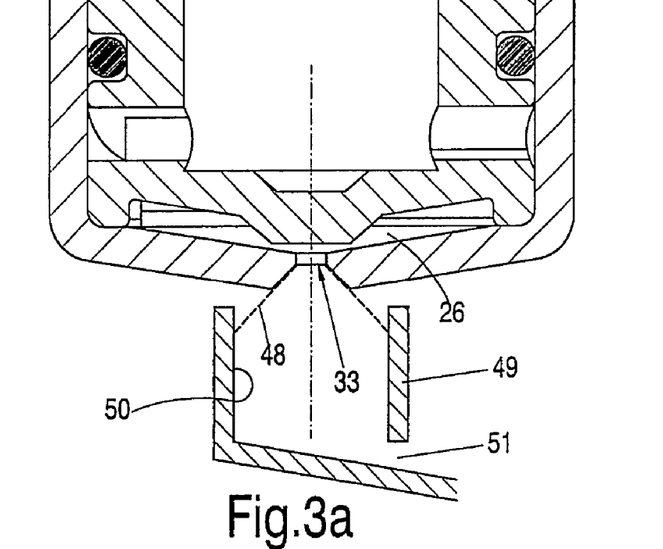
FIG. 3a is an alternative example of the coffee extracting unit of FIG. 3.

In an alternative example shown in FIG. 3a, the collision surface is formed by an inside wall 50 of a tube 49 which extends downward of the outlet passage 33 and is coaxial with the central axis 42 of the outlet passage. The droplets of the conical spray 48 hit the inside wall 50 of the tube 49, thus generating fine bubbles or foam. The coffee extract with the foam flows downward to the outlet 51 of the tube and from there further to the dispensing spouts 38,39. In FIG. 3a, the inside wall of the tube is vertically orientated, i.e. parallel to the central axis 42. It is also possible to have a tapered tube with a tapering wall, preferably with the smallest dimension in the downstream direction. In this way the impact of the droplets for generating foam is more effective.

Figure 3B:
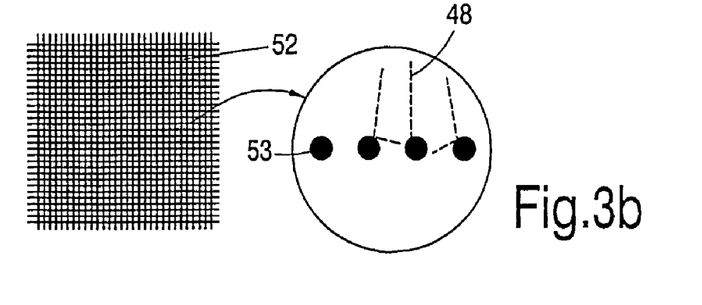
FIG. 3b shows a wire mesh shaped collision surface.

In another example shown in FIG. 3b, the collision surface is formed by a wire mesh 52. The droplets hit the wires 53 of the mesh, thus generating foam. By hitting a wire, a droplet can be split into smaller droplets which hit neighbouring wires. This causes an even finer foam.

Although the sprays described in the above examples are conical rotating sprays, it will be clear that alternative shapes of sprays, such as a straight, parallel spray, may be used to generate a foam layer on top of a beverage.

To integrate automated coffee making with the foam forming function, the coffee maker described also comprises the water reservoir 7 and the water supply conduit 9 communicating with the extracting chamber 13 for supplying water from the reservoir 7 to the extracting chamber 13.

For generating the pressure required for the foam formation, the water reservoir 7, the water supply conduit 9, the extraction chamber 13, the inlet passage 18 and the whirl chamber 26 form an hermetically sealed enclosure, allowing pressure in the enclosure to be discharged via the outlet passage only at least to a significant extent and in the operating condition.

The invention claimed is:

1. A beverage device for making a beverage with a foam layer on top, comprising: foaming means for generating foam from said beverage, said foaming means including (i) at least one inlet opening for receiving beverage under pressure and at least one outlet opening for the beverage with the foam, (ii) means for generating a spray of beverage, including a whirl chamber having inlet passages for receiving the beverage from the inlet passages so that the beverage rotates in the whirl chamber about the axis, the inlet passages extending in a tangential direction with respect to a central axis of the whirl chamber, and further including a central outlet opening for generating the beverage as a substantially-conical, rotating spray, and (iii) a collision surface which, in use, is hit by said conical spray, thereby generating the foam.

2. A beverage device as claimed in claim 1, wherein the whirl chamber has a conical shape narrowing toward the central outlet opening, said central outlet opening being located at the lowest part of the whirl chamber.

3. A beverage device as claimed in claim 1, wherein the central outlet opening has a downstream end, such that a distance between the downstream end of the central outlet opening and the collision surface is in the range of 3 to 7 mm.

4. A beverage device as claimed in claim 1, wherein said conical spray of beverage has a central axis, and the collision surface extends substantially perpendicularly to the central axis of the conical spray.

5. A beverage device as claimed in claim 1, wherein said conical spray of beverage has a central axis, and the collision surface is formed substantially in parallel to the central axis of the conical spray.

6. A beverage device for making a beverage with a foam layer on top, comprising: foaming means for generating foam from said beverage, said foaming means including (i) at least one inlet opening for receiving beverage under pressure and at least one outlet opening for the beverage with the foam, (ii) means for generating a spray of beverage, including a whirl chamber having inlet passages for the beverage which extend in a tangential direction with respect to a central axis of the whirl chamber, and further including a central outlet opening for generating the beverage as a conical spray, and (iii) a collision surface which, in use, is hit by said spray, thereby generating the foam, wherein the foaming means is comprised by an apparatus for making coffee having an extraction chamber for filtering ground coffee by means of water under pressure for obtaining a coffee extract, said means for generating a spray of beverage providing for generating a spray of coffee extract and being situated downstream of the extraction chamber.

7. A beverage device for making a beverage with a foam layer on top, comprising: foaming means for generating foam from said beverage, said foaming means including (i) at least one inlet opening for receiving beverage under pressure and at least one outlet opening for the beverage with the foam, (ii) means for generating a spray of beverage, including a whirl chamber having inlet passages for the beverage which extend in a tangential direction with respect to a central axis of the whirl chamber, and further including a central outlet opening for generating the beverage as a conical spray, and (iii) a collision surface which, in use, is hit by said spray, thereby generating the foam, wherein the conical spray of beverage has a central axis, and the collision surface is formed by an inner cylindrical or tapering wall which extends substantially coaxially with a central axis of the conical spray.

8. A beverage device for making a beverage with foam, the foam being formed of the beverage, comprising:
   inlet passages, the inlet passages receiving the beverage;
   a whirl chamber, the whirl chamber having an axis and disposed to receive the beverage from the inlet passages so that the beverage rotates in the whirl chamber about the axis;
   an outlet passage disposed relative to the whirl chamber so as to discharge the rotating beverage from the whirl chamber as a substantially-conical, rotating spray; and
   a collision surface disposed proximate the outlet passage, such that, in use, the substantially-conical, rotating spray hits the collision surface, thereby generating foam.

9. A beverage device as claimed in claim 8, further comprising a twister branch, the twister branch being disposed between the inlet passages and the whirl chamber, said twister branch having an upstream portion and a downstream portion, the upstream portion branching from the inlet passages so as to enable beverage flow from the inlet passages, and the downstream portion communicating with the whirl chamber so as to issue beverage into the whirl chamber in directions having a tangential component with respect to the axis of the whirl chamber.

10. A beverage device as claimed in claim 9, wherein the upstream portion of said twister branch branches in a radial manner from the inlet passages.

11. A beverage device as claimed in claim 9, wherein the whirl chamber includes a central axis and the downstream portion communicates with the whirl chamber so as to issue beverage into the whirl chamber in a tangential-like direction with respect to the central axis of the whirl chamber.

12. A beverage device for making a beverage with a foam, the foam being formed of the beverage, comprising:
   an inlet passage, the inlet passage receiving the beverage;
   a whirl chamber, the whirl chamber having an axis and disposed to receive the beverage from the inlet passage so that the beverage rotates in the whirl chamber about the axis;
   an outlet passage disposed relative to the whirl chamber so as to discharge the rotating beverage from the whirl chamber as a substantially-conical, rotating spray;
   a collision surface disposed proximate the outlet passage, such that, in use, the substantially-conical, rotating spray hits the collision surface, thereby generating the foam;
   a twister branch, the twister branch being disposed between the inlet passage and the whirl chamber, said twister branch having an upstream portion and a downstream portion, the upstream portion branching from the inlet passage so as to enable beverage flow from the inlet passage, and the downstream portion communicating with the whirl chamber so as to issue beverage into the whirl chamber in directions having a tangential component with respect to the axis of the whirl chamber; and
   additional twister branches, so that at least plural twister branches have respective downstream portions communicating with the whirl chamber so as to issue beverage into the whirl chamber distributed over plural positions, each with a common sense of rotation.

13. A beverage device as claimed in claim 12, wherein the plural positions are evenly distributed circumferentially about the axis of the whirl chamber.

14. A beverage device as claimed in claim 8, wherein the whirl chamber includes a central axis and the outlet passage includes an upstream end, the upstream end being co-axial with the central axis.

15. A beverage device as claimed in claim 8, wherein the outlet passage includes an upstream end, and the whirl chamber has a wall portion facing the upstream end, the wall portion being disposed less than about 0.5 to about 1.0 mm from the upstream end.

16. A beverage device for making a beverage with a foam, the foam being formed of the beverage, comprising:
   an inlet passage, the inlet passage receiving the beverage;
   a whirl chamber, the whirl chamber having an axis and disposed to receive the beverage from the inlet passage so that the beverage rotates in the whirl chamber about the axis;
   an outlet passage disposed relative to the whirl chamber so as to discharge the rotating beverage from the whirl chamber as a substantially-conical, rotating spray; and
   a collision surface disposed proximate the outlet passage, such that, in use, the substantially-conical, rotating spray hits the collision surface, thereby generating the foam;
   wherein the outlet passage includes an upstream end, the outlet passage forming a nozzle having a most restricted section associated with the upstream end and widening in the downstream direction.

17. A beverage device as claimed in claim 16, wherein the nozzle's most restricted section has a cross-sectional area of less than 1 mm$^2$.

18. A beverage device as claimed in claim 16, wherein the outlet passage has a central axis and the nozzle widens in the downstream direction at an average angle, relative to the central axis, from about 45 degrees to about 70 degrees.

19. A beverage device as claimed in claim 8, wherein the outlet passage has a downstream end facing the collision surface at a distance of from about 3 mm to about 7 mm.

\* \* \* \* \*